United States Patent
Bloomcamp et al.

(10) Patent No.: US 10,489,132 B1
(45) Date of Patent: Nov. 26, 2019

(54) AUTHENTICATING MOBILE DEVICE FOR ON BOARD DIAGNOSTIC SYSTEM ACCESS

(71) Applicant: Sprint Communications Company L.P., Overland Park, KS (US)

(72) Inventors: Eric M. Bloomcamp, Olathe, KS (US); Brian J. Finnerty, Stilwell, KS (US); Jeffrey L. Uden, Olathe, KS (US); Shane R. Werner, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/034,475

(22) Filed: Sep. 23, 2013

(51) Int. Cl.
*G06F 8/61* (2018.01)
*G06F 8/65* (2018.01)

(52) U.S. Cl.
CPC . *G06F 8/61* (2013.01); *G06F 8/65* (2013.01)

(58) Field of Classification Search
CPC .............................. G06F 8/61; G06F 8/60–656
See application file for complete search history.

(56) References Cited

U.S. PATENT DOCUMENTS

| | | | |
|---|---|---|---|
| 5,892,900 A | 4/1999 | Ginter et al. | |
| 6,622,083 B1 | 9/2003 | Knockeart et al. | |
| 6,874,680 B1 * | 4/2005 | Klaus | G06F 8/65 235/375 |
| 7,209,964 B2 | 4/2007 | Dugan et al. | |
| 7,366,892 B2 | 4/2008 | Spaur et al. | |
| 7,376,392 B2 | 5/2008 | Myojo | |
| 7,454,473 B2 | 11/2008 | Suzuki | |
| 7,581,111 B2 * | 8/2009 | Wagner | G06F 21/305 713/168 |
| 7,853,609 B2 * | 12/2010 | Dehghan | G06F 8/65 707/778 |

(Continued)

FOREIGN PATENT DOCUMENTS

| | | |
|---|---|---|
| DE | 102011112546 A1 | 4/2014 |
| JP | 20062441 A | 9/2006 |

(Continued)

OTHER PUBLICATIONS

Belkin, Wireless Network Access Point User Manual, published by Belkin Corporation, 2003, pp. 1-36.*

(Continued)

*Primary Examiner* — Thuy Dao
*Assistant Examiner* — Zheng Wei

(57) ABSTRACT

A method of updating an On Board Diagnostic system of a transportation vehicle comprises establishing On Board Diagnostic system access credentials for a mobile device linked to an account of a user of the transportation vehicle, wherein the access credentials are configured to serve as authorization information for access to the On Board Diagnostic system of the transportation vehicle and registering the mobile device to an On Board Diagnostic system access list. The method further comprises receiving the access credentials from the mobile device, authorizing the mobile device to access the On Board Diagnostic system of the transportation vehicle, receiving information about the transportation vehicle, and delivering an update to the mobile device, wherein the mobile device is configured to install the update on the On Board Diagnostic system.

18 Claims, 7 Drawing Sheets

(56) References Cited

U.S. PATENT DOCUMENTS

| | | | |
|---|---|---|---|
| 7,912,224 B2 | 3/2011 | Lee et al. | |
| 7,949,375 B2 | 5/2011 | Kortge | |
| 7,966,111 B2* | 6/2011 | Moinzadeh et al. | 701/29.6 |
| 8,271,050 B2 | 9/2012 | Weiss | |
| 8,397,228 B2* | 3/2013 | Matlin | G06F 8/65 |
| | | | 717/168 |
| 8,417,823 B2 | 4/2013 | Luna et al. | |
| 8,457,686 B2 | 6/2013 | Przybylski | |
| 8,484,707 B1 | 7/2013 | Bertz et al. | |
| 8,527,164 B2 | 9/2013 | Staudinger et al. | |
| 8,548,532 B1 | 10/2013 | Ng | |
| 8,606,335 B2 | 12/2013 | Ozaki | |
| 8,626,152 B2 | 1/2014 | Farrell et al. | |
| 8,630,747 B2 | 1/2014 | Burcham et al. | |
| 8,676,199 B2 | 3/2014 | Madhavan et al. | |
| 8,750,942 B1 | 6/2014 | Ng | |
| 8,787,949 B2 | 7/2014 | Sumcad et al. | |
| 8,918,244 B2 | 12/2014 | Brzezinski et al. | |
| 8,994,591 B2 | 3/2015 | Dupray et al. | |
| 9,002,574 B2* | 4/2015 | Garrett et al. | 701/34.4 |
| 9,031,498 B1 | 5/2015 | Bertz et al. | |
| 9,032,547 B1 | 5/2015 | Hohler et al. | |
| 9,110,774 B1 | 8/2015 | Bonn et al. | |
| 9,128,798 B2* | 9/2015 | Hoffman | G06F 8/65 |
| 9,173,238 B1 | 10/2015 | Bloomcamp et al. | |
| 9,252,951 B1 | 2/2016 | Katzer et al. | |
| 9,256,717 B2* | 2/2016 | Tomfohrde | G06F 21/10 |
| 9,398,454 B1 | 7/2016 | Burcham et al. | |
| 9,439,240 B1 | 9/2016 | Shipley et al. | |
| 9,444,892 B1 | 9/2016 | Amireddy et al. | |
| 9,591,482 B1 | 3/2017 | Finnerty et al. | |
| 9,604,651 B1 | 3/2017 | Amireddy et al. | |
| 9,649,999 B1 | 5/2017 | Amireddy et al. | |
| 2001/0042107 A1* | 11/2001 | Palm | G06F 17/30017 |
| | | | 709/218 |
| 2003/0066884 A1* | 4/2003 | Reddy | G06F 21/10 |
| | | | 235/382.5 |
| 2003/0096641 A1 | 5/2003 | Odinak | |
| 2003/0120601 A1 | 6/2003 | Ouye et al. | |
| 2003/0224840 A1 | 12/2003 | Frank et al. | |
| 2004/0044585 A1 | 3/2004 | Franco | |
| 2004/0083041 A1* | 4/2004 | Skeen et al. | 701/35 |
| 2004/0103203 A1* | 5/2004 | Nichols | H04L 63/0815 |
| | | | 709/229 |
| 2004/0125957 A1 | 7/2004 | Rauber et al. | |
| 2004/0157650 A1 | 8/2004 | Wissinger et al. | |
| 2005/0021744 A1 | 1/2005 | Haitsuka et al. | |
| 2005/0027438 A1 | 2/2005 | Rockett et al. | |
| 2005/0065779 A1 | 3/2005 | Odinak | |
| 2005/0113102 A1 | 5/2005 | Kwon et al. | |
| 2005/0138380 A1* | 6/2005 | Fedronic | G07C 9/00103 |
| | | | 713/172 |
| 2005/0182944 A1* | 8/2005 | Wagner | G06F 21/305 |
| | | | 713/182 |
| 2005/0203968 A1* | 9/2005 | Dehghan | G06F 8/65 |
| 2006/0059480 A1* | 3/2006 | Kimoto | 717/172 |
| 2006/0087971 A1* | 4/2006 | Kim | H04M 3/56 |
| | | | 370/232 |
| 2006/0143463 A1 | 6/2006 | Ikeda et al. | |
| 2006/0154659 A1 | 7/2006 | Roter et al. | |
| 2006/0168578 A1* | 7/2006 | Vorlicek | 717/168 |
| 2007/0028220 A1* | 2/2007 | Miller et al. | 717/124 |
| 2007/0047466 A1* | 3/2007 | Todokoro | H04L 41/046 |
| | | | 370/254 |
| 2007/0086579 A1 | 4/2007 | Lorello et al. | |
| 2007/0113269 A1 | 5/2007 | Zhang | |
| 2007/0124043 A1 | 5/2007 | Ayoub et al. | |
| 2007/0124045 A1 | 5/2007 | Ayoub et al. | |
| 2007/0124046 A1 | 5/2007 | Ayoub et al. | |
| 2007/0160199 A1 | 7/2007 | Sekiguchi et al. | |
| 2007/0198428 A1 | 8/2007 | Satkunanathan et al. | |
| 2007/0288423 A1* | 12/2007 | Kimoto | 707/1 |
| 2008/0021633 A1 | 1/2008 | Naito et al. | |
| 2008/0034126 A1 | 2/2008 | Baker | |
| 2008/0072047 A1 | 3/2008 | Sarikaya et al. | |
| 2008/0148374 A1 | 6/2008 | Spaur et al. | |
| 2008/0162676 A1 | 7/2008 | Magnusson | |
| 2008/0289018 A1* | 11/2008 | Kawaguchi | 726/9 |
| 2008/0289044 A1 | 11/2008 | Choi | |
| 2008/0307086 A1 | 12/2008 | Brooks et al. | |
| 2009/0028082 A1 | 1/2009 | Wynn et al. | |
| 2009/0049119 A1 | 2/2009 | Marcinkiewicz et al. | |
| 2009/0094593 A1* | 4/2009 | Jaung | G06F 8/65 |
| | | | 717/173 |
| 2009/0109941 A1 | 4/2009 | Carter | |
| 2009/0217036 A1 | 8/2009 | Irwin et al. | |
| 2009/0265278 A1* | 10/2009 | Wang | G06F 21/10 |
| | | | 705/54 |
| 2009/0287499 A1 | 11/2009 | Link, II | |
| 2009/0300595 A1* | 12/2009 | Moran | G06F 8/65 |
| | | | 717/170 |
| 2010/0054219 A1* | 3/2010 | Humblet | H04W 48/12 |
| | | | 370/338 |
| 2010/0097239 A1 | 4/2010 | Campbell et al. | |
| 2010/0136944 A1 | 6/2010 | Taylor et al. | |
| 2010/0197362 A1 | 8/2010 | Saitoh et al. | |
| 2010/0220250 A1 | 9/2010 | Vanderwall et al. | |
| 2010/0234071 A1 | 9/2010 | Shabtay et al. | |
| 2010/0235285 A1 | 9/2010 | Hoffberg | |
| 2010/0245122 A1 | 9/2010 | Haralson et al. | |
| 2010/0260350 A1 | 10/2010 | Chutorash et al. | |
| 2010/0285787 A1 | 11/2010 | Matsuda | |
| 2011/0009107 A1* | 1/2011 | Guba et al. | 455/418 |
| 2011/0086668 A1 | 4/2011 | Patel | |
| 2011/0090908 A1* | 4/2011 | Jacobson | H04L 45/745 |
| | | | 370/392 |
| 2011/0098044 A1* | 4/2011 | Aoyagi | H04W 12/08 |
| | | | 455/435.1 |
| 2011/0099316 A1 | 4/2011 | Tseng et al. | |
| 2011/0111728 A1 | 5/2011 | Ferguson et al. | |
| 2011/0252415 A1* | 10/2011 | Ricci | 717/173 |
| 2011/0257973 A1 | 10/2011 | Chutorash et al. | |
| 2011/0263293 A1 | 10/2011 | Blake et al. | |
| 2011/0295444 A1 | 12/2011 | Westra et al. | |
| 2011/0310731 A1 | 12/2011 | Park et al. | |
| 2012/0028597 A1 | 2/2012 | Chmielewski et al. | |
| 2012/0028607 A1 | 2/2012 | Tengler et al. | |
| 2012/0028656 A1 | 2/2012 | Yi et al. | |
| 2012/0109406 A1 | 5/2012 | Yousefi et al. | |
| 2012/0127139 A1 | 5/2012 | Hayami et al. | |
| 2012/0134497 A1 | 5/2012 | Roitshtein et al. | |
| 2012/0142367 A1 | 6/2012 | Przybylski | |
| 2012/0151058 A1* | 6/2012 | Lee | H04L 12/2834 |
| | | | 709/225 |
| 2012/0159638 A1 | 6/2012 | McDade, Sr. | |
| 2012/0167071 A1* | 6/2012 | Paek | 717/170 |
| 2012/0183221 A1 | 7/2012 | Alasry et al. | |
| 2012/0203557 A1 | 8/2012 | Odinak | |
| 2012/0282895 A1 | 11/2012 | Bai et al. | |
| 2012/0324046 A1 | 12/2012 | Park | |
| 2013/0031540 A1* | 1/2013 | Throop | G06F 8/654 |
| | | | 717/173 |
| 2013/0082820 A1 | 4/2013 | Tieman | |
| 2013/0205026 A1 | 8/2013 | Ricci | |
| 2013/0212659 A1* | 8/2013 | Maher | H04L 63/06 |
| | | | 726/6 |
| 2013/0218400 A1 | 8/2013 | Knoop et al. | |
| 2013/0226391 A1 | 8/2013 | Nordbruch et al. | |
| 2013/0232553 A1* | 9/2013 | Tomfohrde | G06F 21/10 |
| | | | 726/4 |
| 2013/0297456 A1 | 11/2013 | Annan et al. | |
| 2014/0052330 A1* | 2/2014 | Mitchell | G06F 8/65 |
| | | | 701/31.5 |
| 2014/0053261 A1* | 2/2014 | Gupta et al. | 726/22 |
| 2014/0068010 A1 | 3/2014 | Nicholson et al. | |
| 2014/0087760 A1 | 3/2014 | Bennett | |
| 2014/0109075 A1* | 4/2014 | Hoffman | G06F 8/65 |
| | | | 717/169 |
| 2014/0128047 A1 | 5/2014 | Edwards et al. | |
| 2014/0130036 A1* | 5/2014 | Gurikar | G06F 8/61 |
| | | | 717/176 |
| 2014/0143354 A1 | 5/2014 | Tiernan | |

(56) References Cited

U.S. PATENT DOCUMENTS

| | | | |
|---|---|---|---|
| 2014/0222298 A1 | 8/2014 | Gurin | |
| 2014/0222910 A1 | 8/2014 | Petersen et al. | |
| 2014/0282470 A1* | 9/2014 | Buga | G06F 8/65 717/170 |
| 2014/0336919 A1 | 11/2014 | Li et al. | |
| 2015/0007155 A1* | 1/2015 | Hoffman | G06F 8/65 717/168 |
| 2015/0288636 A1 | 10/2015 | Yalavarty et al. | |
| 2015/0301822 A1* | 10/2015 | Takahashi | G06F 13/00 717/173 |
| 2016/0098870 A1 | 4/2016 | Bergerhoff et al. | |

FOREIGN PATENT DOCUMENTS

| | | |
|---|---|---|
| WO | 2013166418 A2 | 11/2013 |
| WO | 2013173331 A1 | 11/2013 |

OTHER PUBLICATIONS

Linksys E-Series Router User Guide, publised by Cisco, 2012, pp. 1-92.*

Nilsson et al., Creating a Secure Infrastructure for Wireless Diagnostics and Software Updates in Vehicles, published by Springer-Verlag Berlin Heidelberg 2008, pp. 207-220 (Year: 2008).*

Nilsson et al., Secure Firmware Updates over the Air in Intelligent Vehicles, published by IEEE, 2008, pp. 380-384 (Year: 2008).*

Syed Masud Mahmud, Secure Software Upload in an Intelligent Vehicle via Wireless Communicatin Links, published by IEEE, 2005, pp. 588-593 (Year: 2005).*

Restriction Requirement dated Mar. 19, 2015, U.S. Appl. No. 13/463,799, filed May 3, 2012.

Final Office Action dated Mar. 17, 2015, U.S. Appl. No. 13/769,268, filed Feb. 15, 2013.

Notice of Allowance dated Mar. 12, 2015, U.S. Appl. No. 13/844,226, filed Mar. 15, 2013.

Amireddy, Sridhar Reddy, et al., Patent Application entitled, "Vehicle Remote Operations Control," filed Apr. 28, 2015, U.S. Appl. No. 14/698,522.

Foreign Communication From a Related Counterpart Application, International Search Report and Written Opinion dated Jun. 13, 2013, International Application No. PCT/US13/40940 filed on May 14, 2013.

Foreign Communication From a Related Counterpart Application, International Search Report and Written Opinion dated Dec. 23, 2013, International Application No. PCT/US13/39514 filed on May 3, 2013.

First Action Interview Pre-Communication dated Nov. 15, 2013, U.S. Appl. No. 13/791,658, filed Aug. 20, 2013.

Notice of Allowance dated Jan. 30, 2014, U.S. Appl. No. 13/791,658, filed Aug. 20, 2013.

Foreign Communication From a Related Counterpart Application, International Preliminary Report on Patentability dated Nov. 13, 2014, PCT/US13/39514 filed on May 3, 2013.

Foreign Communication From a Related Counterpart Application, International Preliminary Report on Patentability dated Nov. 27, 2014, PCT/US13/40940 filed on May 14, 2013.

Notice of Allowance dated Dec. 3, 2014, U.S. Appl. No. 13/094,494, filed Apr. 26, 2011.

First Action Interview Pre-Communication dated Dec. 1, 2014, U.S. Appl. No. 13/844,226, filed Mar. 15, 2013.

Notice of Allowance dated Jan. 6, 2015, U.S. Appl. No. 13/661,536, filed Oct. 26, 2012.

Supplemental Notice of Allowance dated Jan. 30, 2015, U.S. Appl. No. 13/661,536, filed Oct. 26, 2012.

First Action Interview Pre-Communication dated Aug. 21, 2012, U.S. Appl. No. 13/218,503, filed Aug. 26, 2011.

First Action Interview Office Action dated Jan. 3, 2013, U.S. Appl. No. 13/218,503, filed Aug. 26, 2011.

Final Office Action dated May 7, 2013, U.S. Appl. No. 13/218,503, filed Aug. 26, 2011.

Advisory Action dated Aug. 1, 2013, U.S. Appl. No. 13/218,503, filed Aug. 26, 2011.

First Action Interview Pre-Interview Communication dated Oct. 26, 2012, U.S. Appl. No. 13/156,438, filed Jun. 9, 2011.

Notice of Allowance dated Feb. 26, 2013, U.S. Appl. No. 13/156,438, filed Jun. 9, 2011.

First Action Interview Pre-Communication dated Jan. 31, 2012, U.S. Appl. No. 13/246,554, filed Sep. 27, 2011.

Final Office Action dated Sep. 5, 2012, U.S. Appl. No. 13/246,554, filed Sep. 27, 2011.

Advisory Action dated Nov. 2, 2012, U.S. Appl. No. 13/246,554, filed Sep. 27, 2011.

Office Action dated Dec. 5, 2012, U.S. Appl. No. 13/246,554, filed Sep. 27, 2011.

Notice of Allowance dated May 20, 2013, U.S. Appl. No. 13/246,554, filed Sep. 27, 2011.

Office Action dated Mar. 13, 2013, U.S. Appl. No. 13/471,107, filed May 14, 2012.

Notice of Allowance dated Aug. 26, 2013, U.S. Appl. No. 13/471,107, filed May 14, 2012.

Aboda, B., et al., "Exentsible Authentication Protocol (EAP)", Network Working Group, RFC 3748, Standards Track, Jun. 2004.

Shipley, Trevor D., et al. Patent Application entitled "Mobile Communication System Identity Pairing," filed Aug. 26, 2011, U.S. Appl. No. 13/218,503.

Bertz, Lyle T., et al., Patent Application entitled "Secure Changing Auto-Generated Keys for Wireless Access," filed Jun. 9, 2011, U.S. Appl. No. 13/156,438.

Ng, Sei Y., Patent Application entitled "Head Unit to Handset Interface and Integration," Filed Sep. 27, 2011, U.S. Appl. No. 13/246,554.

Ng, Sei Y., Patent Application entitled "Head Unit to Handset Interface and Integration," Filed Aug. 20, 2013, U.S. Appl. No. 13/971,658.

Bertz, Lyle T., et al. Patent Application entitled "Automotive Multi-Generation Connectivity," filed Apr. 26, 2011, U.S. Appl. No. 13/094,494.

Annan, Brandon C., et al. Patent Application entitled "Methods and Systems of Digital Rights Management for Vehicles," filed May 3, 2012, U.S. Appl. No. 13/463,799.

Burcham, Robert H., et al. Patent Application entitled "In-car Head unit Wireless Communication Service Subscription Initialization," filed Apr. 24, 2012, U.S. Appl. No. 13/455,121.

Burcham, Robert H., et al. Patent Application entitled "Alternative Authorization for Telematics," filed May 14, 2012, U.S. Appl. No. 13/471,107.

Bloomcamp, Eric Michael, et al. Patent Application entitled "Dual Path In-Vehicle Communication," filed Feb. 15, 2012, U.S. Appl. No. 13/769,268.

Bonn, Michael J., et al. Patent Application entitled "System and Method of Utilizing Driving Profiles via a Mobile Device," filed Mar. 15, 2012, U.S. Appl. No. 13/844,226.

FAIPP Office Action dated May 21, 2012, U.S. Appl. No. 13/246,554, filed Sep. 27, 2011.

Office Action dated Feb. 5, 2014, U.S. Appl. No. 13/218,503, filed Aug. 26, 2011.

Final Office Action dated Jun. 16, 2014, U.S. Appl. No. 13/218,503, filed Aug. 26, 2011.

Office Action—Restriction Requirement dated May 7, 2014, U.S. Appl. No. 13/094,494, filed Apr. 26, 2011.

Advisory Action dated Sep. 26, 2014, U.S. Appl. No. 13/218,503, filed Aug. 26, 2011.

Office Action dated Aug. 28, 2014, U.S. Appl. No. 13/094,494, filed Apr. 26, 2011.

Office Action dated Aug. 12, 2014, U.S. Appl. No. 13/769,268, filed Feb. 15, 2013.

Office Action dated Jul. 14, 2014, U.S. Appl. No. 13/661,536, filed Oct. 26, 2012.

Hohler, Rick A., et al., Patent Application entitled "Provisioning Vehicle based Digital Rights Management for Media Delivered via Phone," filed Oct. 26, 2012, U.S. Appl. No. 13/662,536.

(56) References Cited

OTHER PUBLICATIONS

Finnerty, Brian J., et al., Patent Application entitled "Method for Authenticating Driver for Registration of In-Vehicle Telematics Unit," filed Oct. 31, 2014, U.S. Appl. No. 14/530,667.
Notice of Allowance dated Jun. 12, 2015, U.S. Appl. No. 13/769,268, filed Feb. 15, 2013.
Restriction Requirement dated Feb. 24, 2015, U.S. Appl. No. 14/304,861, filed Jun. 13, 2014.
Office Action dated Jun. 30, 2015, U.S. Appl. No. 14/304,861, filed Jun. 13, 2014.
Restriction Requirement dated Sep. 4, 2015, U.S. Appl. No. 13/455,121, filed Apr. 24, 2012.
Katzer, Robin D., "Vehicle Key Function Control From a Mobile Phone Based on Radio Frequency Link From Phone to Vehicle," filed Jun. 13, 2014, U.S. Appl. No. 14/304,861.
Office Action dated Sep. 9, 2015, U.S. Appl. No. 13/463,799, filed May 3, 2012.
Notice of Allowance dated Sep. 18, 2015, U.S. Appl. No. 14/304,861, filed Jun. 13, 2014.
Office Action dated Jan. 13, 2016, U.S. Appl. No. 13/218,503, filed Aug. 26, 2011.
Final Office Action dated Mar. 10, 2016, U.S. Appl. No. 13/463,799, filed May 3, 2012.
First Action Interview Pre-Communication dated Jan. 29, 2016, U.S. Appl. No. 13/455,121, filed Apr. 24, 2012.
Notice of Allowance dated Mar. 11, 2016, U.S. Appl. No. 13/455,121, filed Apr. 24, 2012.
Notice of Allowance dated Apr. 28, 2016, U.S. Appl. No. 13/218,503, filed Aug. 26, 2011.
Advisory Action dated May 20, 2016, U.S. Appl. No. 13/463,799, filed May 3, 2012.
First Action Interview Pre-Communication dated Apr. 25, 2016, U.S. Appl. No. 14/530,667, filed on Oct. 31, 2014.
Restriction Requirement dated Jan. 29, 2016, U.S. Appl. No. 14/703,997, filed May 5, 2015.
Notice of Allowance dated May 16, 2016, U.S. Appl. No. 14/703,997, filed May 5, 2015.
Amireddy, Sridhar Reddy, et al., Patent Application entitled, "Network Event Management Support for Vehicle Wireless Communication," filed May 5, 2015, U.S. Appl. No. 14/703,997.
Amireddy, Sridhar Reddy, et al., Patent Application entitled, "Vehicle Telematics Unit Communication Authorization and Authentication and Communication Service Provisioning," filed Aug. 8, 2015, U.S. Appl. No. 14/819,425.
Notice of Allowance dated Jan. 18, 2017, U.S. Appl. No. 14/698,522, filed Apr. 28, 2015.
Notice of Allowance dated Nov. 9, 2016, U.S. Appl. No. 14/819,425, filed Aug. 8, 2015.
Service Platform for the Connected Traveler, Sep. 9, 2008, Seventh Fromwork Programme, vol. 1, 28, 43, 71, 87.
Office Action dated Sep. 26, 2016, U.S. Appl. No. 13/463,799, filed May 3, 2012.
FAIPP Office Action dated Jul. 29, 2016, U.S. Appl. No. 14/530,667, filed Oct. 31, 2014.
Notice of Allowance dated Oct. 27, 2016, U.S. Appl. No. 14/530,667, filed Oct. 31, 2014.
First Action Interview Pre-Communication dated Sep. 9, 2016, U.S. Appl. No. 14/698,522, filed Apr. 28, 2015.
Advisory Action dated Jul. 31, 2017 U.S. Appl. No. 13/463,799, filed May 3, 2012.
Final Office Action dated May 12, 2017, U.S. Appl. No. 13/463,799, filed May 3, 2012.
Office Action dated Jan. 30, 2018, U.S. Appl. No. 13/463,799, filed May 3, 2012.
Examiner's Answer to Appeal Brief dated Oct. 18, 2018, U.S. Appl. No. 13/463,799, filed May 3, 2012.

\* cited by examiner

AUTHENTICATING MOBILE DEVICE FOR ON BOARD DIAGNOSTIC SYSTEM ACCESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Automotive vehicles may come equipped with an On Board Diagnostic (OBD) system. On Board Diagnostic systems may be configured to self-diagnose and report malfunctions, damages to the vehicle, changes in fluid levels, etc. On Board Diagnostic systems have progressed from simply indicating the presence of a problem by illuminating a general warning light to providing more detailed warnings specific to the problem identified. For example, rather than illuminating a general warning light, an On Board Diagnostic system may be configured to illuminate a check oil level light in response to detecting that the oil level of the vehicle is below a predetermined minimum level. The On Board Diagnostic system of an automotive vehicle may help prevent avoidable damage to the automotive vehicle resulting from improper maintenance and may help to identify problem areas by providing diagnostic results for the automotive vehicles various systems.

SUMMARY

In an embodiment, a method of updating an On Board Diagnostic system of a transportation vehicle is disclosed. The method comprises establishing On Board Diagnostic system access credentials for a mobile device linked to an account of a user of the transportation vehicle, wherein the access credentials are configured to serve as authorization information for access to the On Board Diagnostic system of the transportation vehicle and registering the mobile device to an On Board Diagnostic system access list. The method further comprises receiving the access credentials from the mobile device, authorizing the mobile device to access the On Board Diagnostic system of the transportation vehicle, receiving information about the transportation vehicle, and delivering an update to the mobile device, wherein the mobile device is configured to install the update on the On Board Diagnostic system.

In an embodiment, a mobile device is disclosed. The mobile device comprises a radio frequency transceiver, a processor, and a memory. The mobile device further comprises an application stored in the memory that, when executed by the processor, configures the processor to initiate a request for access to an On Board Diagnostic system of a transportation vehicle, transmit authorization information in response to receiving an authorization request, receive diagnostic information from the On Board Diagnostic system of the transportation vehicle, download an update based on the received diagnostic information, and upload the update to the On Board Diagnostic system of the transportation vehicle.

In an embodiment, a method of installing firmware in a transportation vehicle is disclosed. The method comprises sending a request to access an On Board Diagnostic system of the transportation vehicle from a mobile device, wherein the On Board Diagnostic system is configured to provide wireless access to the mobile device, receiving, on the mobile device, a request for authorization, and sending, from the mobile device, authorization information in response to receiving the request for authorization. The method further comprises receiving, on the mobile device, an update from a server and installing the update on the transportation vehicle.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
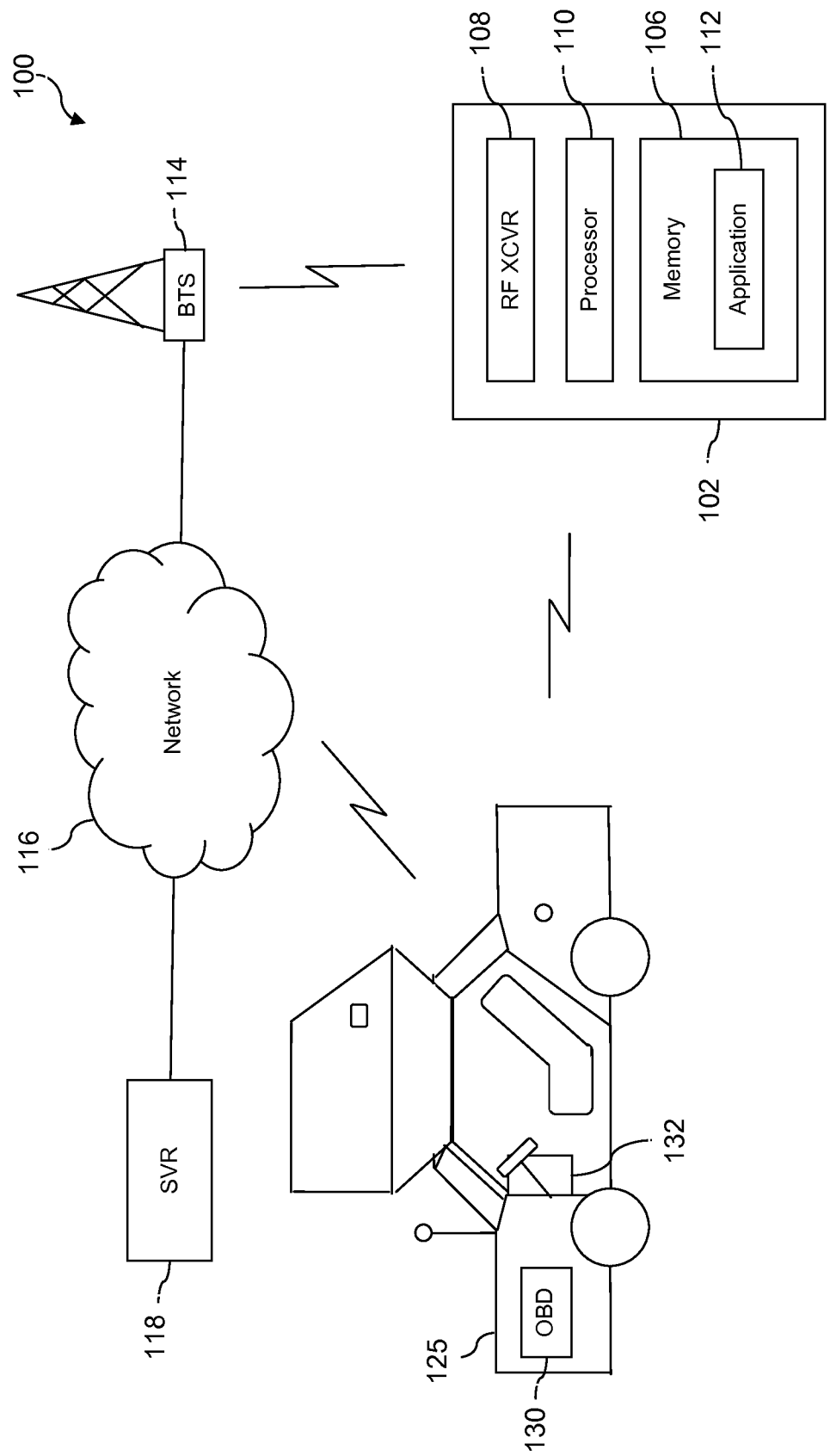
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

On occasion, an On Board Diagnostic (OBD) system of a transportation vehicle may benefit from receiving updated software and/or firmware. Traditionally, when a user wishes to have the On Board Diagnostic system of his/her transportation vehicle updated, he/she will take the transportation vehicle to a dealership that will install the desired updates. This process may be time consuming, inconvenient, and/or expensive for the user and possibly for the manufacturer of the transportation vehicle. The present disclosure teaches updating the On Board Diagnostic system of a transportation vehicle from a mobile device. Additionally, the mobile device may be used to update a head unit of the transportation vehicle, to update general operating software of the transportation vehicle, and to issue commands to the transportation vehicle.

In an embodiment, a user of a transportation vehicle may register his/her mobile device, which may comprise a mobile phone, a cellular phone, a smart phone, a feature phone, a laptop computer, a tablet computer, a notebook computer, or some other mobile communication device, to be included in an On Board Diagnostic system access list for the transportation vehicle. The presence of the mobile device on the On Board Diagnostic system access list may satisfy a permission step for the mobile device to be given access to the On Board Diagnostic system of the transportation vehicle. Registering the mobile device may comprise establishing user credentials and/or other authorization information.

When the user of the transportation vehicle invokes an application on his/her mobile device to request access to the On Board Diagnostic system of the transportation vehicle, the mobile device may receive an authorization request from the On Board Diagnostic system. The mobile device may present a prompt to the user requesting the user to input established user credentials, for example credentials linked to the user in the mobile device's profile on the On Board Diagnostic system access list. The user credentials may comprise a username and password, user credentials, a Personal Identification Number (PIN), or other authorization information. The mobile device may transmit these user credentials to the On Board Diagnostic system, and the On Board Diagnostic system may grant the mobile device access to the On Board Diagnostic system in response to successful receipt of the user credentials from the mobile device.

Once the mobile device has been granted access to the On Board Diagnostic system, the user may be able to view the software and/or firmware installed on the transportation vehicle, for example to view software and/or firmware version identities in a user interface screen of the mobile device. In some cases, the user may determine or may receive a prompt indicating that a software and/or firmware update may be beneficial. In this case, the user may select to update the software and/or firmware of the transportation vehicle. In an embodiment, the mobile device may request to receive an update from a network based on information received from the On Board Diagnostic system. Alternatively, the transportation vehicle may transmit recommended update information to the network, and the network may send the update to the mobile device in response to the update information received from the transportation vehicle. The update may then be uploaded to the transportation vehicle from the mobile device. The mobile device may upload the update to the transportation vehicle via the On Board Diagnostic system using a wireless and/or wired connection to the On Board Diagnostic system.

Additionally, once the mobile device has been given access to the On Board Diagnostic system, the user may view diagnostic information gathered by the On Board Diagnostic system, for example diagnostic information may be presented on a user interface screen of the mobile device. Diagnostic information may comprise information about fluid levels, information about tire pressure, information about detected damages and/or malfunctions, information about major vehicle systems, and/or other information. The user may further be given access to other components and functionalities offered by the transportation vehicle after the mobile device has been given access to the On Board Diagnostic system. For example, the user may be able to unlock the transportation vehicle, start the transportation vehicle, roll down the windows of the transportation vehicle, and/or invoke some other functionality of the transportation vehicle using the mobile device, for example by providing control inputs or selections to a user interface screen presented by the mobile device.

It is anticipated that the ability to access one or more vehicle systems through the On Board Diagnostic system of a transportation vehicle from a mobile device may improve convenience and lower update and maintenance expenses for a user of the transportation vehicle by allowing the user to perform updates without taking the transportation vehicle to a dealership. It is further anticipated that the user may benefit from the security measures surrounding authorizing his/her mobile device to access the On Board Diagnostic system of the transportation vehicle. Registering the mobile device and establishing user credentials may provide increased security by allowing the On Board Diagnostic system to not only recognize that an approved mobile device is requesting access but also to recognize, based on provided user credentials, that an authorized user is operating the mobile device.

Turning now to FIG. 1, a communication system 100 is described. In an embodiment, the communication system 100 comprises a transportation vehicle 125, a network 116, a server 118, a base transceiver station 114, and a mobile device 102. In an embodiment, the transportation vehicle 125 comprises an On Board Diagnostic system (OBD) 130 and a head unit 132. In an embodiment, the mobile device 102 comprises a radio frequency transceiver (RF XCVR) 108, a processor 110, a memory 106, and an application 112 stored in the memory 106. The radio frequency transceiver 108 may be a cellular radio transceiver. In an embodiment, the mobile device 102 may comprise additional radio transceivers (not shown) that may be referred to in some contexts as short range radio transceivers, where "short" is a relative term with reference to the relatively "long" range communications provided by cellular communications, such as communication with the base transceiver station 114. The additional radio transceivers may be one or more of a Wi-Fi radio transceiver, a Bluetooth radio transceiver, or other short range radio transceiver. In an embodiment, the mobile device 102 may comprise a mobile phone, a smart phone, a cell phone, a feature phone, a media player, a Personal Digital Assistant (PDA), a handheld device, a tablet computer, a notebook computer, a laptop computer, or some other mobile device.

In an embodiment, the On Board Diagnostic system 130 may be configured to gather information about the transportation vehicle 125. For example, the On Board Diagnostic system 130 may be configured to gather information about fluid levels, tire pressure, major systems of the transportation vehicle 125, the engine of the transportation vehicle 125, malfunctions, damages, internal temperatures, installed software, installed firmware, and/or other information about the transportation vehicle 125. For example, the On Board Diagnostic system 130 may communicate with various sensors throughout the transportation vehicle 125. In some contexts, such information may be referred to as diagnostic information. In some cases, the On Board Diagnostic system 130 may perform periodic checks of the transportation vehicle 125 and may indicate detected problems. For example, a check oil-level light may be illuminated by the On Board Diagnostic system 130 in response to detecting that the oil-level of the transportation vehicle 125 has dropped below a predetermined threshold.

The On Board Diagnostic system 130 may be accessible through a port contained in the transportation vehicle 125. In some contexts, the port may be described as an outlet, a socket, a dock, a drive, or as something else. For the sake of clarity, the term "port" will be used hereinafter to describe an access point to the On Board Diagnostic system 130. In an embodiment, the port may be generally located on a steering column of the transportation vehicle 125, on the head unit 132 of the transportation vehicle 125, on a center console of the transportation vehicle 125, on a dashboard of the transportation vehicle 125, within three feet of a steering wheel of the transportation vehicle 125, or in some other location that provides access to an electrical system of the transportation vehicle 125.

The head unit 132 may be implemented as a computer system. Computer systems are described in more detail hereinafter. In an embodiment, the head unit 132 may comprise one or more interfaces configured to provide access to a plurality of functionalities of the transportation vehicle 125 such as access to an audio player, access to a radio, access to time, date, and weather displays, access to climate control, access to a media player, and/or access to other functionalities. The head unit 132 may communicate with the On Board Diagnostic system 130 through a wireless connection to an On Board Diagnostic system attachment plugged into the port, wherein the On Board Diagnostic system attachment may comprise a wireless adaptor configured to facilitate wireless communication with the On Board Diagnostic system 130. Alternatively, the head unit 132 may communicate with the On Board Diagnostic system 130 through a link cable plugged into both the head unit 132 and the port. In some cases, the head unit 132 may comprise the port and may communicate with the On Board Diagnostic system 130 directly.

In an embodiment, the head unit 132 may comprise an intelligent processor that monitors some vehicle systems and presents information about the transportation vehicle 125 to a user, for example presents information to a driver on a display panel in a dashboard of the transportation vehicle 125. The head unit 132 may further comprise one or more radio transceivers to enable various communication functionalities. The head unit 132 may integrate a variety of functions comprising one or more of an audio system, a navigation system, a cellular communication system, a fuel consumption monitoring system, a maintenance schedule system, and other functions. The head unit 132 may provide a user interface that promotes a user selecting functions and inputting control selections to the head unit 132. In an embodiment, the head unit 132 may be a hardware item and/or an electronics box that is located within the transportation vehicle 125, for example in or behind a dashboard, in an engine compartment, under a seat, in a trunk, or in some other location within the vehicle. In some contexts, the head unit 132 may be referred to as a telematics unit.

In an embodiment, the head unit 132 may comprise an interface configured to allow a user of the transportation vehicle 125 to interact with the On Board Diagnostic system 130. The user may invoke the interface to interact with the On Board Diagnostic system 130 when the user is physically within reach of the head unit 132, or alternatively, the user may access the head unit 132 through wireless communication from the mobile device 102 in order to interact with the On Board Diagnostic system 130. The head unit 132 may comprise an Evolution Data Optimized (EV-DO) connection, a Wi-Fi connection, a Bluetooth connection, a Long Term Evolution (LTE) connection, a Near Field Communication transceiver, or some other connection through which the mobile device 102 may communicate. In an embodiment, the On Board Diagnostic system 130 may serve as a communications port through which communication with the head unit 132 may occur.

In an embodiment, the head unit 132 may have one or more telematics capabilities. A user of the transportation vehicle 125 may access a Global Positioning System (GPS), use hands-free phone capabilities, and/or wirelessly access systems of the transportation vehicle 125 through the head unit 132. For example, the user may use the mobile device 102 to communicate wirelessly with the head unit 132 to start the ignition of the transportation vehicle 125, turn on a radio of the transportation vehicle 125, adjust the seats of the transportation vehicle 125, unlock/lock the transportation vehicle 125, access the On Board Diagnostic system 130, turn on/off a climate control system of the transportation vehicle 125, turn on/off an electrical system of the transportation vehicle 125, obtain information about one or more systems of the transportation vehicle 125, and/or the user may communicate wirelessly with the head unit 132 to perform other tasks.

In an embodiment, the mobile device 102 may bypass interaction with the head unit 132 when interacting with the On Board Diagnostic system 130. For example, the mobile device 102 may communicate with the On Board Diagnostic system 130 by being connected to the port or by communicating wirelessly with the On Board Diagnostic system attachment plugged into the port. The On Board Diagnostic system attachment may have limited range, and the mobile device 102 may be unable to bypass interaction with the head unit 132 when attempting to communicate wirelessly with the On Board Diagnostic system 130 while outside the wireless range of the On Board Diagnostic system attachment. In an embodiment, the On Board Diagnostic system attachment may have a range of about 50 yards, about 100 yards, about 200 yards, about 300 yards, about 500 yards, about 1000 yards, or of about some other distance. The On Board Diagnostic system attachment may comprise a battery configured to provide power and/or the On Board Diagnostic system attachment may draw power from an electrical system of the transportation vehicle 125.

The mobile device 102 may comprise the application 112 configured to invoke the radio frequency transceiver 108 to initiate communication with the On Board Diagnostic system 130. Successfully establishing communication with the On Board Diagnostic system 130 may allow a user of the mobile device 102 to view diagnostic information concerning the transportation vehicle 125. In an embodiment, communication with the On Board Diagnostic system 130 may allow the user of the mobile communication device to access the head unit 132, to access a Global Positioning System of the transportation vehicle 125, to lock/unlock the transportation vehicle 125, to adjust a radio of the transportation vehicle 125, to operate one or more systems of the transportation vehicle 125, and/or to perform other telematics functions.

In an embodiment, access to the On Board Diagnostic system 130 may be limited to authorized devices included on an On Board Diagnostic system access list. In some cases, wireless access may be limited to listed devices while devices accessing the On Board Diagnostic system 130 by connecting to the port may be considered authorized without being included on the On Board Diagnostic system access list. The head unit 132 may be automatically authorized by virtue of being a component of the transportation vehicle 125. Conversely, in some cases, any access to the On Board Diagnostic system 130 may be limited to authorized devices.

In an embodiment, a user of the transportation vehicle 125, for example a driver and/or owner of the vehicle, may register his/her mobile device 102 to be included on the On Board Diagnostic system access list for the transportation vehicle 125. Registering the mobile device 102 may comprise first logging into the On Board Diagnostic system 130 and/or the head unit 132 and invoking a registration process. As part of the registration process, the user and/or drive may input user credentials, user profile information, user identification information, authorization information, authorization credentials, clearance information, and/or some other access credentials. In some cases, user credentials, user profile information, user identification information, authorization information, authorization credentials, clearance information, and access credentials may comprise similar information. Registering the mobile device 102 may link and/or associate the mobile device 102 with an account and/or profile of the user. For the sake of clarity, verification information configured to authorize the mobile device 102 for access to the On Board Diagnostic system 130 will be referred to hereinafter as "access credentials." The access credentials established for the mobile device 102 may serve to verify that an authorized user is operating the mobile device 102.

In an embodiment, the access credentials established for the mobile device 102 may comprise a Personal Identification (PIN) number, an access code, a username and password combination, an account number, a password unaffiliated with a username, an image, personal information of the user, the correct answer to a predetermined question, a picture password, a sequence password, a Mobile Identifier (MID) of the mobile device 102, a transceiver connection identity of the mobile device 102, or some other information. The access credentials may help prevent unauthorized parties from accessing the On Board Diagnostic system 130 from the user's mobile device 102. In some cases, multiple access credentials may be established for the same mobile device 102 and/or multiple mobile devices 102 may be registered on the On Board Diagnostic system access list. In some cases, only mobile devices 102 that have been approved by the user may be added to the On Board Diagnostic system access list. The On Board Diagnostic system access list and the information contained therein, i.e. access credentials, registered devices, and other information, may be stored at a location accessible through the network 116, such as the server 118, or at a location within the transportation vehicle 125.

In an embodiment, a user of the mobile device 102 may invoke the application 112 to request access to the On Board Diagnostic system 130 and may receive an authorization request from the On Board Diagnostic system 130 through the On Board Diagnostic system attachment. While in some cases the authorization request may originate in the network 116 or on the mobile device 102, for the purposes of this disclosure authorization requests configured to authenticate the mobile device 102 for access to the On Board Diagnostic system 130 will be described as coming from the On Board Diagnostic system 130. The user of the mobile device 102 may be prompted to input access credentials in response to receiving the authentication request. The mobile device 102 may send access credentials provided by the user or otherwise obtained to the On Board Diagnostic system 130 through the On Board Diagnostic system attachment or to the network 116. In some cases, access credentials may be sent to the On Board Diagnostic system 130 at the same time as the access request. Upon receipt of valid access credentials, the mobile device 102 may be allowed to access the On Board Diagnostic system 130.

With access to the On Board Diagnostic system 130, the user of the mobile device 102 may be able to gain access to functionalities that may not be controlled by the On Board Diagnostic system 130 by invoking the head unit 132 of the transportation vehicle 125 from his/her mobile device 102. For example, the user of the mobile device 102 may be able to unlock doors and/or windows, turn on and turn off the transportation vehicle 125, roll windows up or down, adjust the temperature inside the transportation vehicle 125, start an audio player, start a media player, turn on or off a radio, adjust seating, adjust mirrors, or do something else. In order to perform requested actions quickly, functionalities may be invoked from the mobile device 102 without fully booting up the head unit 132 since fully booting up the head unit may take upwards of one minute which may decrease the convenience of the remote access capability of the mobile device 102. The mobile device 102 may accomplish this by communicating wirelessly with the On Board Diagnostic system attachment. In some cases, the head unit 132 may be partially booted up to provide access to desired functionalities.

In an embodiment, the On Board Diagnostic system 130 may contain information about the software and/or firmware installed on various systems of the transportation vehicle 125. For example, the On Board Diagnostic system 130 may contain information about the software and/or firmware installed on the head unit 132 and/or information about the software and/or firmware installed on the On Board Diagnostic system 130. The On Board Diagnostic system 130 may determine that an update of the software and/or firmware of the transportation vehicle 125 may be beneficial. The On Board Diagnostic system 130 may determine that an update may be beneficial when it can be determined that installed software and/or firmware is out of date, damaged, missing, or for some other reason. Alternatively, a user of the mobile device 102 may determine that it is time for an update of the software and/or firmware of the transportation vehicle 125 after viewing information gathered by the On Board Diagnostic system 130 or by otherwise querying the On Board Diagnostic system 130.

In an embodiment, the On Board Diagnostic system 130 may request an update from the network 116 in response to determining that an update may be beneficial. The request may be sent from the head unit 132 or from the On Board Diagnostic system attachment. Alternatively, an update request may be sent from the mobile device 102 to the network 116 or to the On Board Diagnostic system 130 which may then relay the request to the network 116. In response to receiving the update request, the network 116 may send updated and/or new software and/or firmware to the transportation vehicle 125. In some cases, the update may be sent from a service delivery platform of the network 116. The updated and/or new software and/or firmware may be taken from the server 118 or from another location, such as a data store, accessible through the network 116. The update may be sent to the head unit 132, to the On Board Diagnostic system attachment, or to the mobile device 102. The network 116 may preferentially deliver the update to the mobile device 102 when the update is large. In the case of a large update, the mobile device 102 may receive a prompt directing the user to seek a Wi-Fi connection in order to receive the update. In this case, the mobile device may store the update for later transmission to the transportation vehicle 125.

If the update is sent to and/or stored on the mobile device 102, then the mobile device 102 may upload, install, transmit, provide, or otherwise convey the update to the transportation vehicle 125. For example, the mobile device 102 may upload the update to the On Board Diagnostic system 130 in response to receiving the update from the network 116. In an embodiment, the mobile device 102 may deliver the update to the transportation vehicle 125 wirelessly, or the mobile device 102 may deliver the update to the transportation vehicle 125 by uploading the update to the port. In some cases, the mobile device 102 may be requested to re-authorize before delivering the update to the transportation vehicle 125. This may allow the update to be received by the mobile device 102 over a local connection (e.g., Wi-Fi) and then be sent to the transportation vehicle 125 over a short range connection (e.g., Wi-Fi, Bluetooth, ZigBee, etc.), thereby lessening the load on the network 116.

Figure 2:
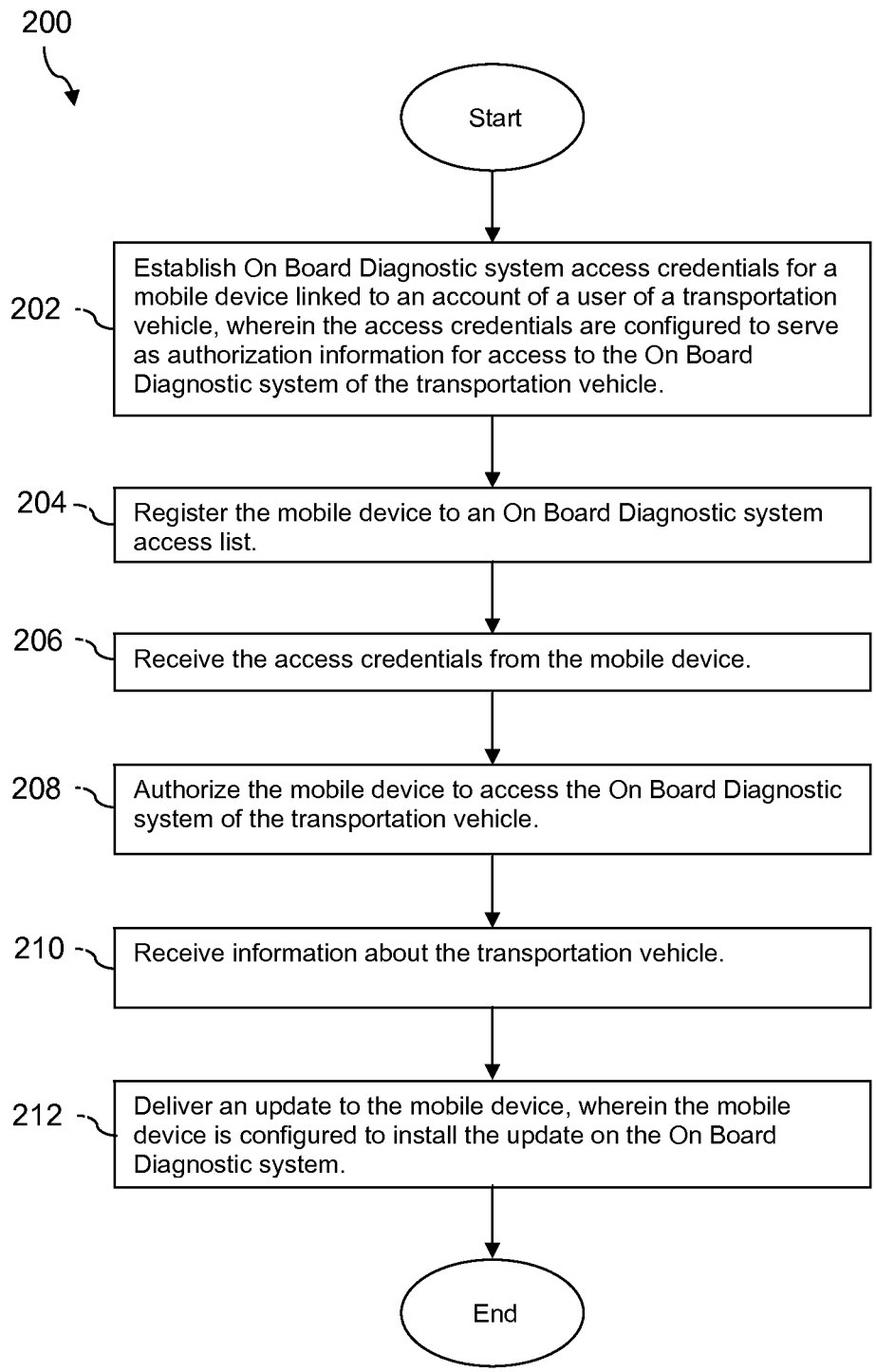
FIG. 2 is a flowchart of a method according to an embodiment of the disclosure.

Turning now to FIG. 2, a method 200 is described. The method 200 may be performed by one or more components of the communication system 100 described hereinabove with reference to FIG. 1. At block 202, On Board Diagnostic system access credentials may be established for a mobile device linked to an account of a user of a transportation vehicle. In some contexts, the user account may be referred to as a user profile. The access credentials may be configured to serve as authorization information for access to the On Board Diagnostic system of the transportation vehicle. The mobile device may be registered to an On Board Diagnostic system access list at block 204. In an embodiment, the establishment of access credentials may be a step in the registration of the mobile device to the On Board Diagnostic system access list. Authorization information may be received from the mobile device at block 206. Authorization information may comprise the access credentials established for the mobile device.

At block 208, the mobile device may be authorized to access the On Board Diagnostic system of the transportation vehicle. Authorizing the mobile device to access the On Board Diagnostic system of the transportation vehicle may allow the mobile device to wirelessly access diagnostic information and/or other information stored on the transportation vehicle. Information about the transportation vehicle may be received at block 210. The information may be received from the mobile device, from the On Board Diagnostic system, or from the head unit. In an embodiment, the information may be obtained by the mobile device by querying the On Board Diagnostic system or the transportation vehicle. The information may comprise error codes, warning information, information about the major systems of the transportation vehicle, information about the software and/or firmware of the On Board Diagnostic system, information about the software and/or firmware of the transportation vehicle, other information about the On Board Diagnostic system, or other information about the transportation vehicle. An update may be delivered to the mobile device at block 212, wherein the mobile device may be configured to install the update on the On Board Diagnostic system.

Figure 3:
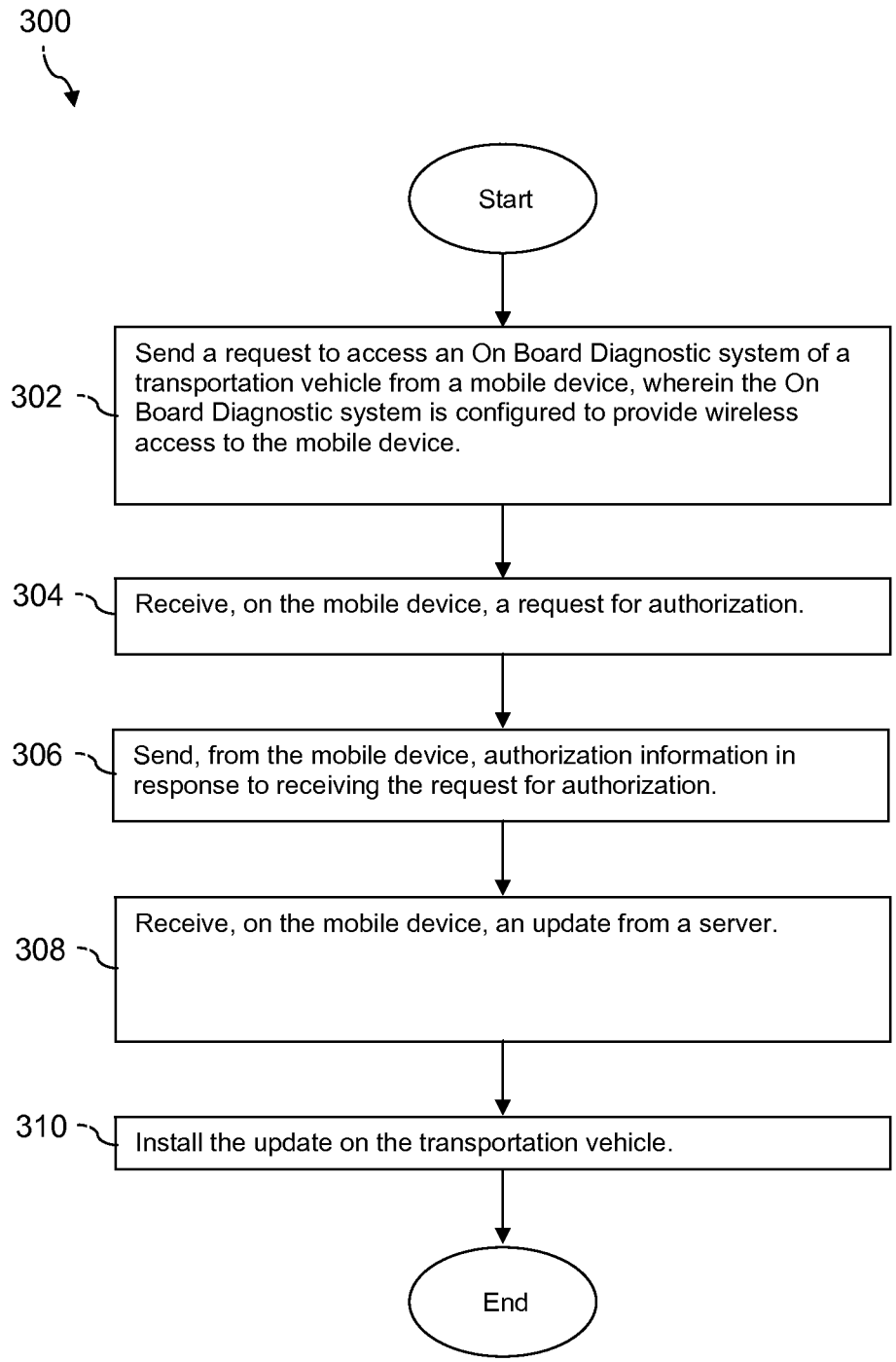
FIG. 3 is a flowchart of a method according to an embodiment of the disclosure.

Turning now to FIG. 3, a method 300 is described. The method 300 may be performed by one or more elements of the communication system 100 described hereinabove with reference to FIG. 1. At block 302, a request to access an On Board Diagnostic system of a transportation vehicle may be sent from a mobile device. The request to access the On Board Diagnostic system may be sent to an On Board Diagnostic system attachment. The On Board Diagnostic system may be configured to provide wireless access to the mobile device. In some cases, the On Board Diagnostic system may provide wireless access to the mobile device through the On Board Diagnostic system attachment. In an embodiment, the On Board Diagnostic system attachment may be plugged into a port that allows the On Board Diagnostic system attachment to provide access to the On Board Diagnostic system.

At block 304, a request for authorization may be received on the mobile device. The request for authorization may be received from the On Board Diagnostic system attachment or from a network entity. In response to receiving the request for authorization, authorization information may be sent from the mobile device at block 306. The authorization information may be sent to the On Board Diagnostic system attachment or to the network entity responsible for sending the request for authorization. The authorization information may comprise information substantially similar to the authorization information and/or access credentials described hereinabove with reference to FIG. 1 and FIG. 2.

At block 308, the mobile device may receive an update from a server. In some cases, the update may not be sent until the authorization information can be validated. Authorization information may be valid if it matches access credentials established by a user of the transportation vehicle for a mobile device listed on an On Board Diagnostic system access list. The update may have been sent to the mobile device in response to receiving information about the transportation vehicle. The update may be installed on the transportation vehicle at block 310. The update may be installed wirelessly over-the-air, or alternatively, the update may be installed by plugging the mobile device into a port providing access to the On Board Diagnostic system of the transportation vehicle.

Figure 4:
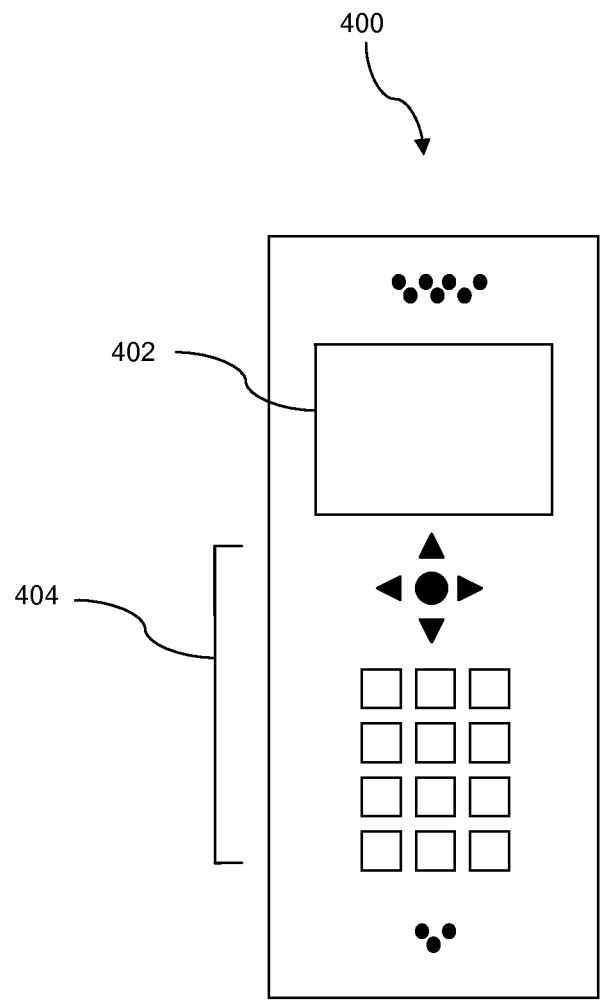
FIG. 4 is an illustration of a mobile device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
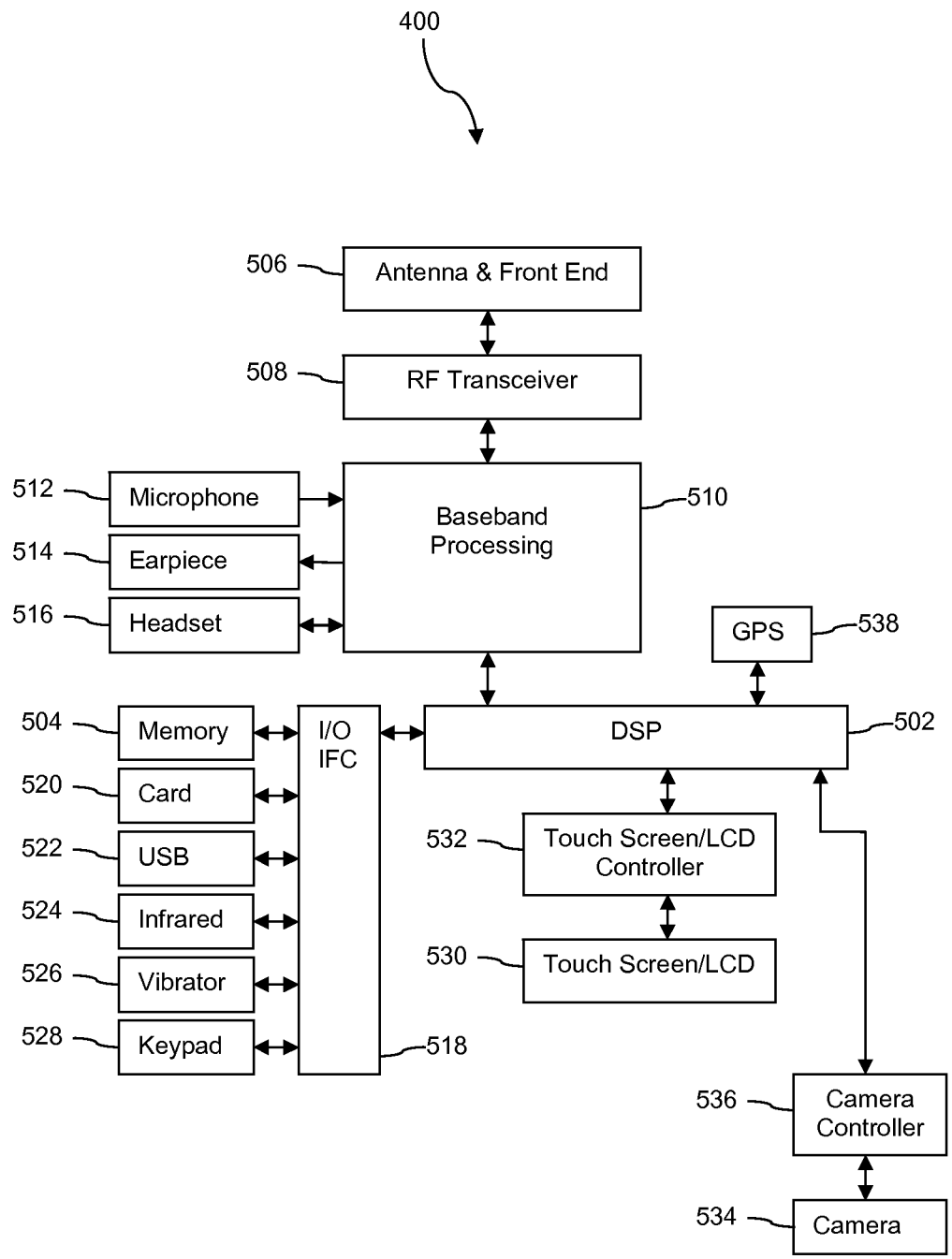
FIG. 5 is a block diagram of a mobile device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF)

transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
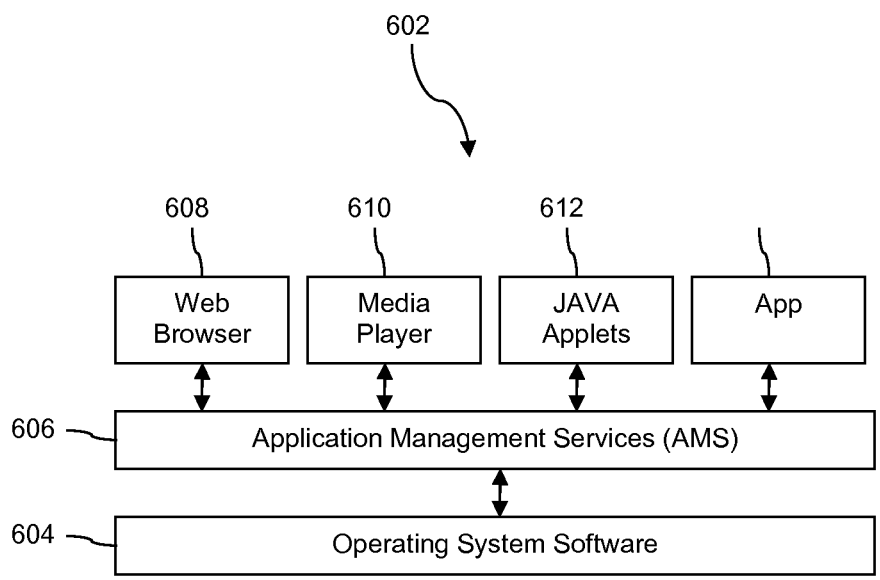
FIG. 6A is a block diagram of a software architecture of a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
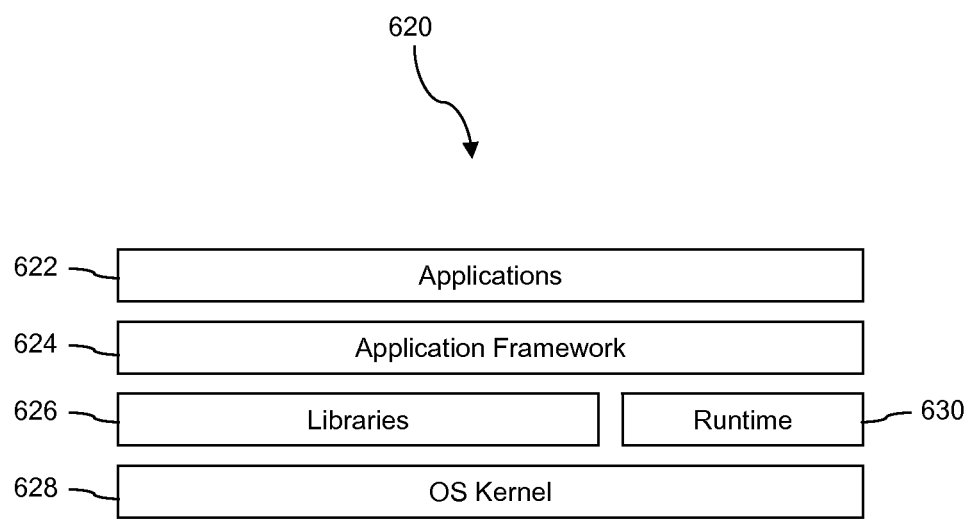
FIG. 6B is a block diagram of another software architecture according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
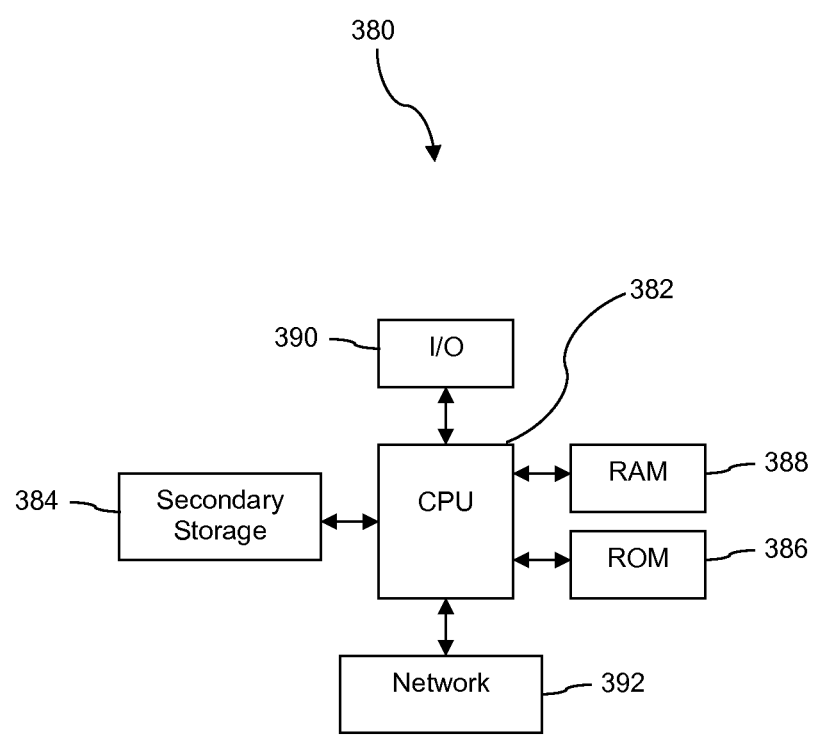
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of installing firmware in a transportation vehicle having an On Board Diagnostic (OBD) system, comprising:
    registering a mobile device with an On Board Diagnostic (OBD) system by the mobile device logging into the OBD system and inputting information including access credentials via user input to the OBD system to add the mobile device to an OBD system access list for the transportation vehicle, wherein the access credentials are used to verify that an authorized user is operating the mobile device, and wherein the OBD system access list for the transportation vehicle is stored on a server accessible through a wireless network;
    in response to invocation of an application on the mobile device, sending, by the mobile device, a request to access the OBD system of the transportation vehicle, wherein the OBD system is configured to provide wireless access to the mobile device;
    receiving, by the mobile device, a request for authorization from the OBD system;
    sending, by the mobile device, authorization information to the OBD system in response to receiving the request for authorization, wherein the OBD system grants the mobile device access responsive to verifying that the mobile device is being operated by an authorized user based on the authorization information sent by the mobile device matching the access credentials in the OBD system access list established during registration; and
    in response to the mobile device being granted access to the OBD system:
        receiving, by the wireless network, recommended update information from the transportation vehicle, the recommended update information recommending a software update or a firmware update beneficial for the transportation vehicle;
        receiving, on the mobile device based on the stored OBD system access list for the transportation vehicle, an update from the server in communication with the mobile device over the wireless network responsive to receipt of the recommended update information, the update corresponding to the software update or the firmware update indicated in the recommended update information as beneficial for the transportation vehicle; and
        installing, by the mobile device, the update on the OBD system.

2. The method of claim 1, wherein installing the update comprises wirelessly transmitting the update from the mobile device.

3. The method of claim 1, wherein installing the update comprises delivering the update to the transportation vehicle through a direct connection of the mobile device with an OBD system port.

4. The method of claim 1, wherein the mobile device receives updates that exceed a predetermined size from the server through a Wi-Fi connection.

5. The method of claim 1, wherein sending authorization information comprises sending pre-established access credentials linked to a profile of a user of the transportation vehicle.

6. The method of claim 1, wherein the update was sent to the mobile device in response to receiving information about the transportation vehicle.

7. A method of updating an On Board Diagnostic (OBD) system of a transportation vehicle, comprising:
    registering a mobile device with an On Board Diagnostic (OBD) system by the mobile device logging into the OBD system and inputting information including access credentials via user input to the OBD system to add the mobile device to an OBD system access list for the transportation vehicle, the registering comprising establishing, by the OBD system, the access credentials for the mobile device linked to an account of a user of the transportation vehicle, wherein the access credentials are used to verify that an authorized user is operating the mobile device, and wherein the OBD system access list for the transportation vehicle is stored at a location accessible through a wireless network;
    in response to invocation of an application on the mobile device, receiving, by the OBD system, a request to access the OBD system;
    receiving, by the OBD system, the access credentials from the mobile device;
    authorizing, by the OBD system, the mobile device to access the OBD system of the transportation vehicle responsive to verifying that the mobile device is being operated by an authorized user based on matching the received access credentials with the OBD system access list established during registration;
    determining information about the transportation vehicle; and
    in response to the mobile device being granted access to the OBD system:

transmitting, to the wireless network, recommended update information, the recommended update information recommending a software update or a firmware update beneficial for the transportation vehicle; and receiving, by the OBD system, an update from the mobile device, wherein the mobile device is configured to install the update on the OBD system responsive to receiving, from the wireless network based on the stored OBD system access list, the update corresponding to the software update or the firmware update indicated in the recommended update information as beneficial for the transportation vehicle.

8. The method of claim 7, wherein the access credentials comprise at least one of a Personal Identification Number (PIN), an access code, a username and password combination, an account number, a password unaffiliated with a username, an image, personal information of the user, the correct answer to a predetermined question, a picture password, or a sequence password.

9. The method of claim 7, wherein the mobile device is a mobile phone.

10. The method claim 7, wherein the mobile device is one of a laptop computer, a notebook computer, or a tablet computer.

11. The method of claim 7, wherein information about the transportation vehicle comprises at least one of error codes, warning information, information about the major systems of the transportation vehicle, information about the firmware of the OBD system, or other information about the OBD system.

12. The method of claim 7, wherein the update delivered to the mobile device comprises firmware to be installed in the transportation vehicle.

13. A mobile device, comprising:
a radio frequency transceiver;
a processor;
a memory; and
an application stored in the memory that, when executed by the processor, configures the processor to:
register the mobile device with an On Board Diagnostic (OBD) system of a transportation vehicle by the mobile device logging in to the OBD system and inputting information including access credentials via user input to the OBD system to add the mobile device to an OBD system access list for the transportation vehicle, wherein the access credentials are used to verify that an authorized user is operating the mobile device, and wherein the OBD system access list for the transportation vehicle is stored on a server accessible through a wireless network, in response to a subsequent invocation of the application on the mobile device, initiate a request for access to the On Board Diagnostic (OBD) system, transmit authorization information to the OBD system in response to receiving an authorization request from the OBD system, wherein the OBD system grants the mobile device access responsive to verifying that the mobile device is being operated by an authorized user based on matching the authorization information transmitted by the mobile device with the access credentials in the OBD system access list established during registration, receive diagnostic information from the OBD system, and in response to the mobile device being granted access to the OBD system:
receive an update from a server in communication with the mobile device over the wireless network based on the stored OBD system access list responsive to the wireless network receiving recommended update information from the transportation vehicle, the update including a software update or a firmware update indicated in the recommended update information as being beneficial for the transportation vehicle, and
install the update to the OBD system.

14. The mobile device of claim 13, wherein only devices listed on the OBD system access list for the transportation vehicle are eligible to be granted access to the OBD system of the transportation vehicle.

15. The mobile device of claim 13, wherein the OBD system access list for the transportation vehicle comprises mobile devices approved by a user of the transportation vehicle.

16. The mobile device of claim 13, wherein the processor is configured to upload the update to the transportation vehicle wirelessly.

17. The mobile device of claim 13, wherein authorization information comprises at least one of personal access credentials, a Personal Identification Number (PIN), an access code, a username and password combination, an account number, a password unaffiliated with a username, an image, personal information of the user, the correct answer to a predetermined question, a picture password, or a sequence password.

18. The mobile device of claim 13, wherein the application further configures the processor to prompt a user to provide the authorization information in response to receiving the authorization request from a network.

* * * * *